United States Patent
Hsu et al.

(10) Patent No.: US 8,089,285 B2
(45) Date of Patent: Jan. 3, 2012

(54) IMPLEMENTING TAMPER RESISTANT INTEGRATED CIRCUIT CHIPS

(75) Inventors: Louis L. Hsu, Fishkill, NY (US); David W. Kruger, Pleasant Valley, NY (US); James S. Mason, Eastleigh (GB); Richard W. Oldrey, Clintondale, NY (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 12/396,512

(22) Filed: Mar. 3, 2009

(65) Prior Publication Data

US 2010/0225380 A1    Sep. 9, 2010

(51) Int. Cl.
*G01R 31/02* (2006.01)
*G01R 31/26* (2006.01)
*G06F 12/14* (2006.01)
*G06F 7/04* (2006.01)

(52) U.S. Cl. .......... 324/555; 324/762.01; 713/194; 726/26

(58) Field of Classification Search .......... 324/537, 324/500, 555, 762.01; 206/701, 807; 340/5.82, 340/652, 5.8, 5.81, 539.31; 702/117, 116, 702/108; 713/194; 726/2, 21, 23, 27, 35
See application file for complete search history.

(56) References Cited

U.S. PATENT DOCUMENTS

| | | | |
|---|---|---|---|
| 6,246,970 B1 * | 6/2001 | Silverbrook et al. | 702/117 |
| 6,496,022 B1 | 12/2002 | Kash et al. | |
| 6,910,165 B2 | 6/2005 | Chen et al. | |
| 7,098,394 B2 | 8/2006 | Armer et al. | |
| 7,115,912 B2 | 10/2006 | Kash et al. | |
| 7,685,438 B2 * | 3/2010 | Knudsen | 713/194 |
| 7,945,792 B2 * | 5/2011 | Cherpantier | 713/194 |
| 2006/0081497 A1 * | 4/2006 | Knudsen | 206/701 |
| 2008/0251905 A1 * | 10/2008 | Pope et al. | 257/679 |
| 2008/0251906 A1 * | 10/2008 | Eaton et al. | 257/686 |
| 2010/0058077 A1 * | 3/2010 | Matsuda et al. | 713/194 |

* cited by examiner

*Primary Examiner* — Hoai-An D Nguyen
(74) *Attorney, Agent, or Firm* — Joan Pennington

(57) ABSTRACT

A method and tamper resistant circuit for resisting tampering including reverse engineering in a semiconductor chip, and a design structure on which the subject circuit resides are provided. A sensing device for detecting a chip tampering state is formed with the semiconductor chip including the circuitry to be protected. A tamper resistant control signal generator is coupled to the sensing unit for generating a tamper resistant control signal responsive to a detected chip tampering state. A functional operation inhibit circuit is coupled to the tamper resistant control signal generator for inhibiting functional operation of the circuitry to be protected responsive to the tamper resistant control signal.

23 Claims, 8 Drawing Sheets

IMPLEMENTING TAMPER RESISTANT INTEGRATED CIRCUIT CHIPS

FIELD OF THE INVENTION

The present invention relates generally to the data processing field, and more particularly, relates to a method and tamper resistant circuit for resisting tampering such as reverse engineering in a semiconductor chip, and a design structure on which the subject circuit resides.

DESCRIPTION OF THE RELATED ART

As used in the following description and claims, the term "semiconductor chip" should be broadly understood to include a semiconductor chip, an integrated circuit, and a semiconductor chip assembly including a package and semiconductor chip.

Major semiconductor companies heavily invest in research and development (R&D), and in the associated intellectual property. Failure to adequately protect intellectual property is very damaging to the semiconductor industry. In addition, a significant military concern associated with placing high technology on the battlefield is the risk of that technology falling into the enemy's hands. Sophisticated entities can possess sufficient expertise and capability to reverse engineer devices and components.

There are an increasing number of instances of the counterfeiting of chip design and processing methods. One form of counterfeiting is the unauthorized direct copying of the integrated circuit (IC), and reproduction of its layout design and topography or mask work, the fabrication of an IC based on this mask work and the sale of the resulting chips under a different company's name.

Another form of counterfeiting involves illegally reverse engineering a competitor's IC and stealing the design material and process recipes. In order for semiconductor companies to reduce their losses due to such counterfeiting, it is necessary for them to also test and analyze any suspicious IC and determine whether their design or intellectual properties have been infringed.

A destructive method can be used to determine the processes and materials that are used in the IC fabrication process and to uncover the physical locations of the sub-circuits or circuit elements.

Often destructive methods require de-packaging, and sometimes at least partially dissecting the IC, making it impossible to use the IC afterwards. Further, these prior art methods typically involve significant manual intervention by skilled personnel. Therefore, the methods are very expensive and time consuming. In addition, some types of information about circuits, such as the contents of non-volatile semiconductor memories cannot be obtained by using this method.

A non-destructive way of reverse engineering can determine the logical functions and other functional characteristics of the sub-circuits or circuit elements, determine the device-level schematics of the transistors comprising each sub-circuit or circuit element, test the performance of the sub-circuits or circuit elements comprising the IC and extract the stored information necessary for the operation of some circuit.

One method of reverse engineering a chip component is performed using high-energy photons, electrons, ions or a focused ion beam (FIB) to excite active portions of the chip, and then to observe other chip portions that are affected. These processes when employed for the purposes of reverse engineering a component are done in a powered-on state in order to make the logic function.

U.S. Pat. No. 6,496,022, to Kash et al., entitled "Method and Apparatus for Reverse Engineering Integrated Circuits by Monitoring Optical Emission," and assigned to the present assignee, discloses a non-destructive method for reverse engineering by monitoring induced light emissions from the active elements in integrated circuit chips. Known methods of reverse engineering integrated circuits by monitoring induced light emissions from the active elements in the IC provide a very powerful tool for extracting information from an integrated circuit as well as for determining the circuit topology. The optical methods of non-destructively obtaining information about the design, operation, programmable parameters, and performance of an integrated circuit provide a possible approach to reverse engineering an integrated circuit by combining the physical appearance of the circuit elements, and using the effect of the operation of the circuit to produce light.

A non-invasive method, denoted as pico-second imaging circuit analysis (PICA) can be used to characterize the gate-level performance of such chips and identify the locations and nature of their operational faults. A reverse engineering method adopting PICA requires the chip to be removed from the package or, alternatively, forming an opening in the package to allow the emitted light to be detected, and thinning the substrate of the chip to allow weak light signals to escape and be detected. Flip-chip packages have an advantageous orientation since the backside of chip is already facing the outside of package. Therefore, it is possible that the chip can be thinned without being removed from the package. For wire-bonded chips, in order to thin the backside, the chip is most often removed from the package. In some cases though a window can be opened through the bottom of the package and up to the chip, after which a window can be thinned in the chip. Once the chip is thinned, its original pads can be used for chip contact probing. In some cases the chip is removed from the package and new connections are made to the chip bond pads for probing. During PICA testing, all the power supplies, ground and signal lines must be properly connected so that various test patterns can be forced to the chip and resulting circuit functions recorded. The PICA technique can also be used to study chip functionality and detect circuit failures, such as fails resulting from reliability, process or design qualification testing.

The IC must be functional in order to run PICA test patterns. Light emitted as transistors change state is collected with high-sensitivity photodetectors. Signal waveforms of circuit operation are built up over multiple iterations of test patterns. The PICA technique is most often applied to find subtle fails such as "soft" or intermittent fails found during reliability and qualification testing, e.g. timing issues in logic circuits, and to verify circuit models.

U.S. Pat. No. 7,115,912, to Chen et al., entitled "Device for defeating reverse engineering of integrated circuits by optical means," and assigned to the present assignee, discloses a method to place devices or metal runners on an IC to block detection of pattern of emitted optical light signal external to circuit supporting substrate. The metal runners can be opaque structures that blocks emissions from being detected external to the IC. Alternatively, the devices can reduce light emissions from the transistors to prevent detection of the light emissions external to the IC. The devices, in another embodiment, can emit extraneous light signals to hide a pattern of light emissions emitted from the transistors. This method may be ineffective because the PICA technique can include detecting optical emission from the front side as well as backside of the chip. When using backside approach, the chip is thinned and therefore Back End of Line (BEOL) dummy metal runners would not be in the light path from the transistors to the photodetectors.

A need exists for an improved, more effective anti-tampering mechanism to resist reverse engineering in a semiconductor chip.

SUMMARY OF THE INVENTION

Principal aspects of the present invention are to provide a method and tamper resistant circuit for resisting tampering including reverse engineering in a semiconductor chip, and a design structure on which the subject circuit resides. Other important aspects of the present invention are to provide such method, circuit and design structure substantially without negative effect and that overcome many of the disadvantages of prior art arrangements.

In brief, a method and tamper resistant circuit for resisting tampering including reverse engineering in a semiconductor chip, and a design structure on which the subject circuit resides are provided. A sensing device for detecting a chip tampering state is formed with the semiconductor chip including the circuitry to be protected. A tamper resistant control signal generator is coupled to the sensing unit for generating a tamper resistant control signal responsive to a detected chip tampering state. A functional operation inhibit circuit is coupled to the tamper resistant control signal generator for inhibiting functional operation of the circuitry to be protected responsive to the tamper resistant control signal.

In accordance with features of the invention, the sensing device for detecting a chip tampering state includes a photodetector for sensing light or other electromagnetic energy including, for example, a photoresistor or a photodiode.

In accordance with features of the invention, the tamper resistant control signal generator provides a zero value for the tamper resistant control signal during normal operation, wafer level testing, and module testing.

In accordance with features of the invention, the functional operation inhibit circuit deactivates an on-chip DC generator block for inhibiting functional operation of the circuitry to be protected responsive to the tamper resistant control signal.

In accordance with features of the invention, the functional operation inhibit circuit deactivates an on-chip I/O block for inhibiting functional operation of the circuitry to be protected responsive to the tamper resistant control signal.

In accordance with features of the invention, the functional operation inhibit circuit deactivates an on-chip clock generator block for inhibiting functional operation of the circuitry to be protected responsive to the tamper resistant control signal.

In accordance with features of the invention, the functional operation inhibit circuit includes a multiplexer for selecting a clock output from a random noise generator instead of a clock generator for inhibiting functional operation of the circuitry to be protected responsive to the tamper resistant control signal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, an enhanced method and a tamper resistant circuit for resisting tampering including reverse engineering in a semiconductor chip are provided. The tamper resistant circuit includes three key elements: (1) one or more sensing devices to detect that the package has been opened or removed, (2) generating at least one tamper resistance (TR) enable signal to enable TR operation and (3) disabling at least one circuit block to prevent chip from being fully operational after being tampered.

Figure 1:
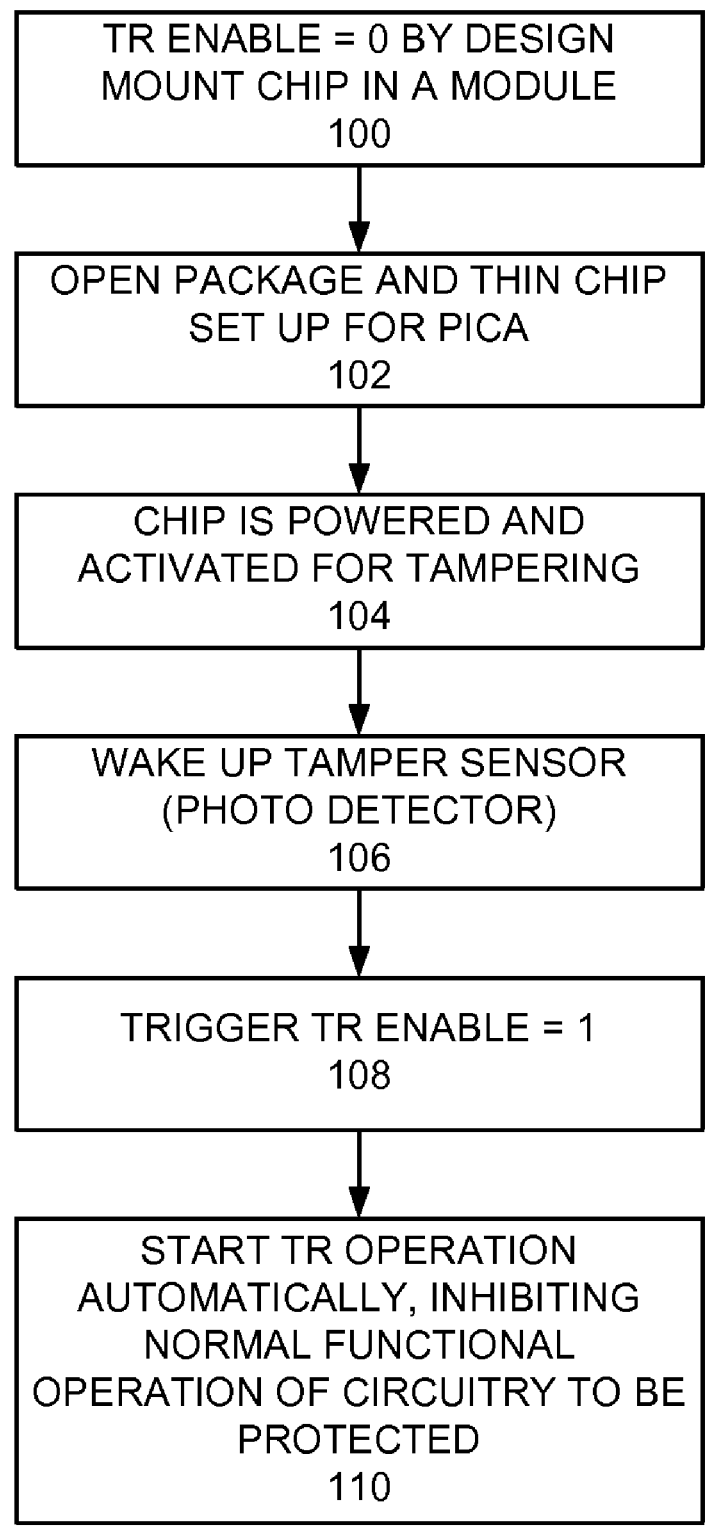
FIG. 1 is a flow chart illustrating exemplary steps of an anti-tampering method implemented by a tamper resistant circuit for resisting reverse engineering in a semiconductor chip in accordance with the preferred embodiment.

Having reference now to the drawings, in FIG. 1, there are shown exemplary steps of an anti-tampering method implemented by a tamper resistant circuit for resisting reverse engineering in a semiconductor chip in accordance with the preferred embodiment. A critical point is that the TR operation should not be triggered inadvertently during normal operation. As indicated at a block 100, by default design, the TR enable signal should always be at logic low (=0) during normal operation, wafer level testing, and module testing. It is crucial that TR setup should not affect wafer level testing, module testing or normal operation. It must only be triggered when the package that carries the chip is opened or removed. Typically before PICA testing, the package module of the semiconductor chip including the circuitry to be protected is often opened and chip is removed from the package. After the chip is thinned, remounted, powered and activated for tampering as indicated at blocks 102 and 104, a sensor device or tamper sensor such as photodetector, photoresistor, or any other similar means is triggered as indicated at a block 106. Based upon the same principle, sensors can be built on the chip as well as on the package of a chip assembly.

As indicated at a block 108, a package-open state is detected, which triggers the TR enable signal (=1).

As described, the on-chip (or off-chip) tamper sensors are photodetectors, such as a photodiode. However, it should be understood that the present invention is not limited to the use of such photodetectors. Other detecting schemes or mechanisms, such as, an on-chip (or off-chip) solar cell, moisture sensor, micro-switch, MEMS, gas sensor, motion detector, RF detector, and the like could be used in accordance with the present invention. An on-chip (or off-chip) solar cell, which can be used to sense module-open state, is disclosed in U.S. Pat. No. 7,098,394 to Armer et al, issued Aug. 29, 2006. These sensing devices and circuits can be integrated in the chip together with other circuits in accordance with the present invention.

As indicated at a block 110, since the chip is set up, powered-on and ready for PICA testing, the chip starts tamper-resistant operation automatically, inhibiting normal functional operation of circuitry to be protected in the semiconductor chip responsive to the TR enable signal (=1). The chip is inhibited from normal operation, or the chip ceases to function at all responsive to the tamper resistant control signal or the TR enable signal (=1).

Figure 2A:
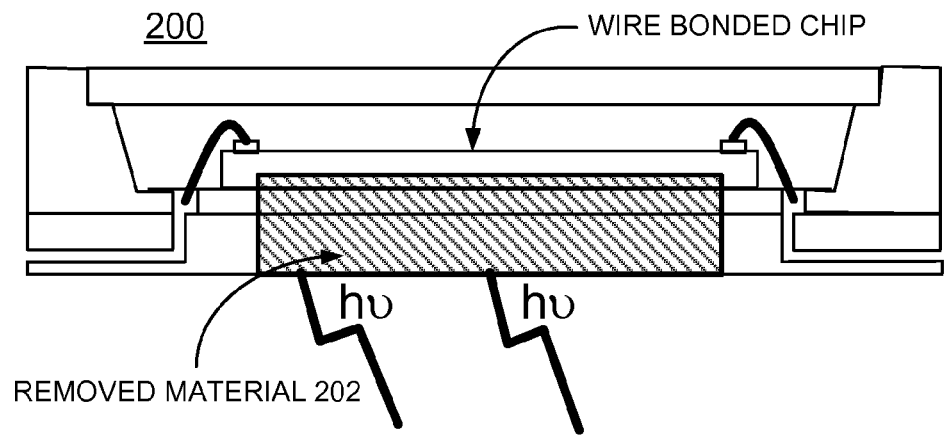
FIGS. 2A and 2B illustrate respective example package structures including wire-bond and flip-chip for use with an anti-tampering method implemented by a tamper resistant circuit for resisting reverse engineering in a semiconductor chip in accordance with the preferred embodiment.
Figure 2B:
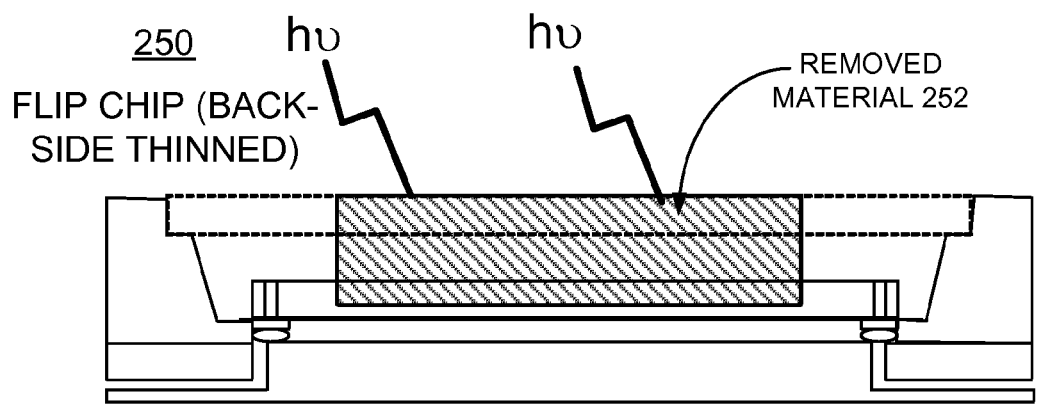

Referring now to FIGS. 2A and 2B, there are shown respective example package structures including wire-bond and flip-chip for use with an anti-tampering method implemented by a tamper resistant circuit for resisting reverse engineering in a semiconductor chip in accordance with the preferred embodiment.

In FIG. 2A, there is shown a chip generally designated by the reference character 200 that is installed in a module via the conventional wire-bond method. Hatched lines indicate a thinned area of removed material 202 with lines labeled hv indicating input light energy to the IC chip 200, where E=hv, where h represents Planck's constant and v represents frequency of the incoming light. The circuits and pads are located at the top surface of the chip are facing up. For this case, the bottom of the package and a portion of the bulk silicon below the chip must be removed, for example by precision milling or hot acid or plasma etching techniques. In this way the module connections can still be used to provide power, ground and signals contacts, in order to run test patterns, and an optical sensor can sense the fact that the module has been opened, and trigger the TR signal when the chip is powered for testing. Or, the chip can be removed from the package and its backside is thinned and then remounted to the package.

FIG. 2B shows another chip generally designated by the reference character 250. Chip 250 is installed in a module by a conventional flip-chip bonding method. The circuits and pads are located at the top surface of the chip and are facing down. A backside is thinned with removed material 252 indicated by hatched lines with lines labeled hv indicating light emissions external to the IC chip 250. When the module is opened, an optical sensor can sense the module-open state and trigger the TR signal when the chip is powered for testing. Again, the thinning process can either be done with chip installed or removed from the package.

Figure 3:
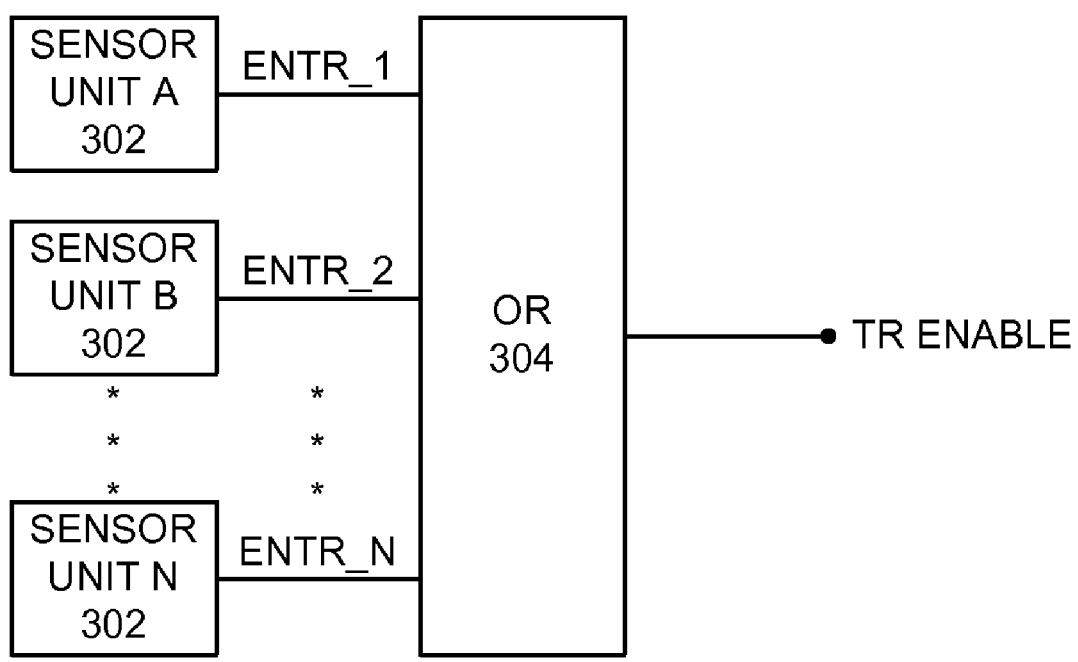
FIG. 3 is a schematic diagram representation illustrating an example sensing system for detecting a chip tampering state in accordance with the preferred embodiment.

Referring now to FIG. 3, there is shown an example sensing system generally designated by the reference character 300 for detecting a chip tampering state in accordance with the preferred embodiment. The on-chip (or off-chip) sensing system 300 includes a plurality of sensor units 302, A-N distributed across the chip to obtain a reliable sensing mechanism. As shown, an OR gate 304 is used to incorporate all generated tamper resistance enable signal (ENTR1 to ENTR_N) and provide an output signal TR ENABLE to disable at least one key circuit block of the semiconductor chip being protected. During normal operation, the signal TR ENABLE=0.

Figure 4A:
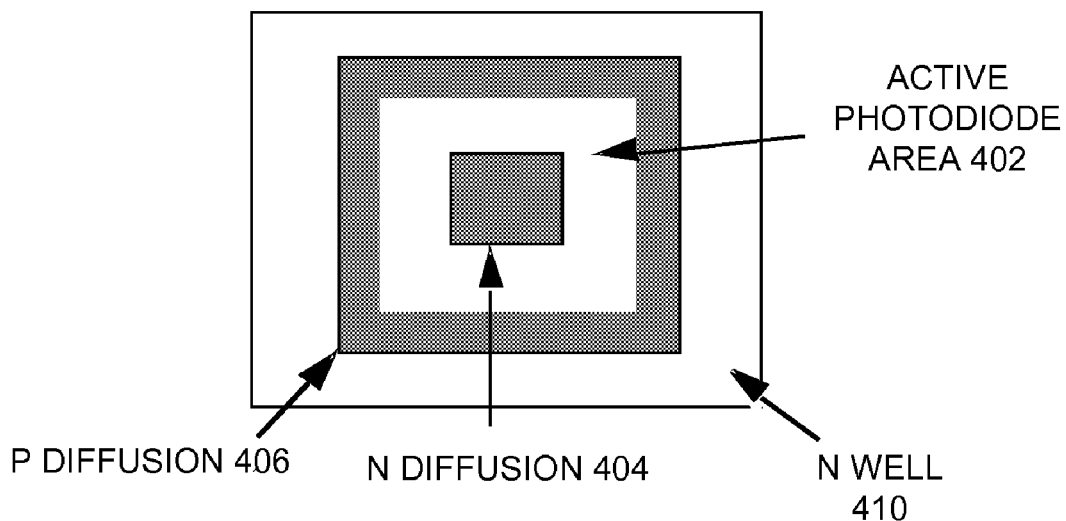
FIGS. 4A and 4B are respective fragmentary IC chip top and side views illustrating an example sensing device for detecting a chip tampering state in accordance with the preferred embodiment.
Figure 4B:
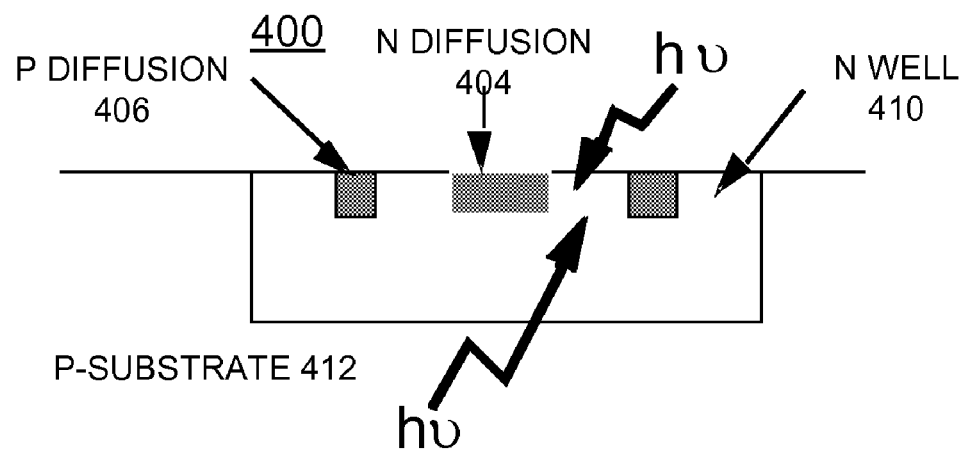

Referring now to FIGS. 4A and 4B, there is shown an example tamper sensing device generally designated by the reference character 400 for detecting a chip tampering state in accordance with the preferred embodiment. Tamper sensing device 400 is a photodiode device 400 that advantageously is used to implement the plurality of sensor units 302, A-N shown in FIG. 3. The integrated photodiode 400 includes an active photodiode area 402 formed with an N diffusion 404, and a P diffusion area 406 built into an N well 410 defined in a P-type substrate 412 within a bulk CMOS process. The integrated photodiode 400 is sensitive to incoming light indicated by arrows labeled hv from above or below the structure. There are many other options to design and fabricate CMOS-compatible sensing devices using silicon or SiGe substrates, which are well known to persons skilled in the art without requiring further description here.

Figure 5:
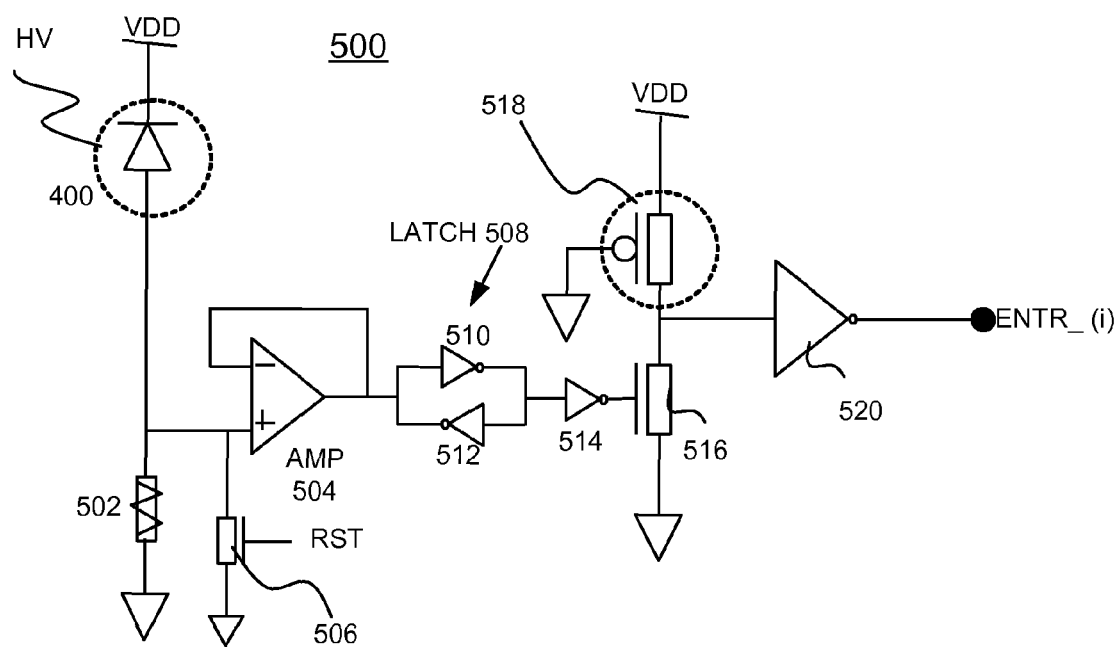
FIG. 5 is a schematic diagram representation illustrating an example tamper resistant control signal generator for generating a tamper resistant control signal responsive to the sensing unit detecting a chip tampering state in accordance with the preferred embodiment.

Referring now to FIG. 5, there is shown an example tamper resistant control signal generator generally designated by the reference character 500 for generating a tamper resistant control signal responsive to the sensing unit detecting a chip tampering state in accordance with the preferred embodiment. The tamper resistant control signal generator 500 generates an output tamper-resistance enable signal ENTR_(i) responsive to detecting a chip tampering state. The tamper resistant control signal generator 500 includes a photodetector for sensing light or other electromagnetic energy including, for example, a photoresistor or a photodiode 400.

The tamper resistant control signal generator 500 includes a tamper sensing device 400 connected in series with a resistor 502 connected between a voltage supply VDD and ground. The tamper resistant control signal generator 500 includes at least one photodiode 400 as a light-controlled current source.

A junction connection of the photodiode 400 and resistor 502 is applied to a first input + of an amplifier 504 having a second input − connected to an amplifier output. Upon receiving light, the current flow in the photodiode 400 is increased. The amount of light falling on the photodiode 400 directly controls the current flow. The current is converted to a voltage by the pull down resistor 502 thereby pulling up the voltage level to the first input + of an amplifier 504.

The amplifier 504 is an operational amplifier wired as a voltage follower to isolate the photodiode block from a next stage. Although not strictly necessary, the voltage follower amplifier 504 ensures the tamper detector's results are not affected by the input resistance to the next stage.

A reset signal RST is applied to a gate of an N-channel field effect transistor 506, which is connected between the input + of an amplifier 504 and ground. The reset signal RST is provided to initialize the TR signal to logic low. To guarantee ENTR_(i)=0 during wafer test, a fuse circuit (not shown) may be used to hold RST=1. When chip is installed in a module, the fuse is blown and at that point, the chip is protected from being tampered. This will guarantee no TR operation whatsoever if the module is not opened or removed.

The output of the amplifier 504 is connected to a latch 508, which is formed, by a pair of reverse connected inverters 510, 512. The latch 508 latches the data sensed by the photodiode sensor 400, which is applied via another inverter 514 to a gate input of an NFET 516, which is connected in series with weak pull-up device, P-channel field effect transistor (PFET) 518. The weak pull-up PFET 518 and NFET 516 are connected in series between the voltage supply VDD and ground. The weak pull-up weak pull-up PFET 518 is used to pull the input of an inverter 520 to logic high and thus by default the output of the generator ENTR is always forced to low.

When the photodiode sensor 400 senses a tamper or module-open state, the photodiode sensor 400 switches on a strong pull down NFET 516, which overcomes the weak pull-up PFET 518. The design of the tamper resistant control signal generator 500 prevents the output ENTR_(i)=0 form being triggered, for example, by a noise spike or weak leakage due to a defective device.

Figure 6:
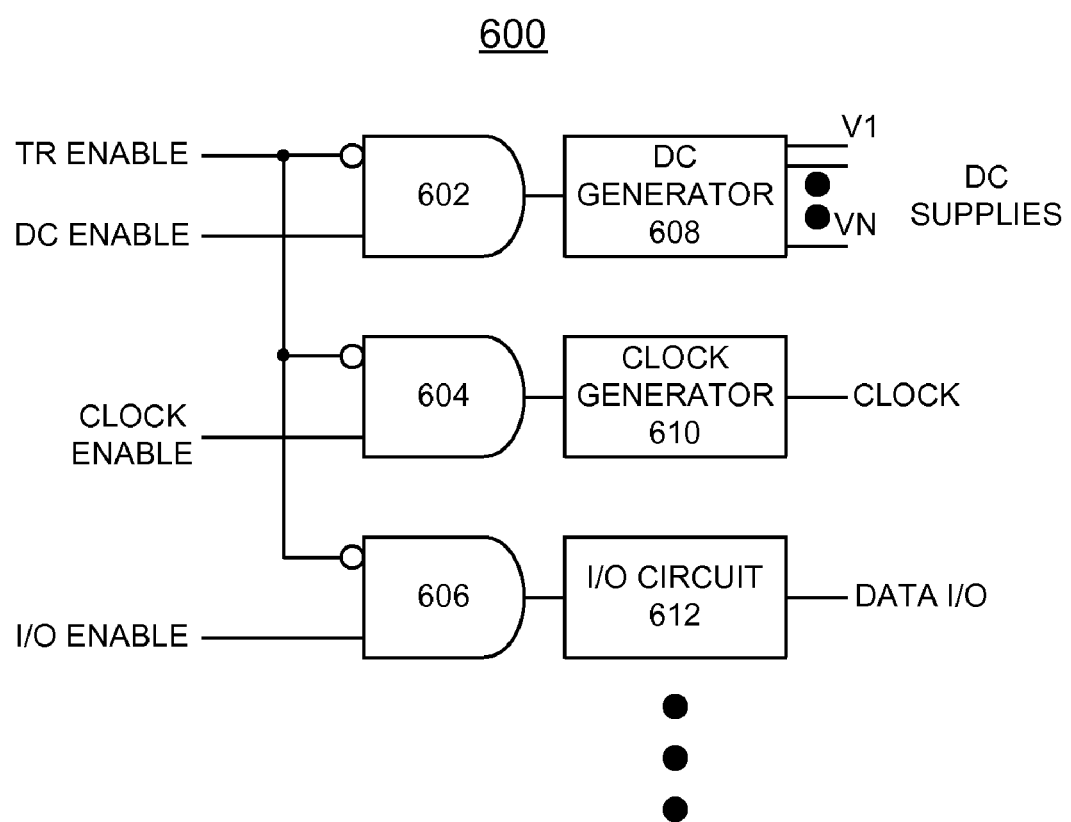
FIG. 6 is a schematic diagram representation illustrating an example functional operation inhibit circuit for inhibiting functional operation of the circuitry to be protected responsive to the tamper resistant control signal generated by the tamper resistant control signal generator of FIG. 5 in accordance with the preferred embodiment.

Referring now to FIG. 6, there is shown an example functional operation inhibit circuit generally designated by the reference character 600 for inhibiting functional operation of the circuitry to be protected responsive to the tamper resistant control signal generated by the on-chip (or off-chip) sensing system 300 of FIG. 3 or the tamper resistant control signal generator 500 of FIG. 5 in accordance with the preferred embodiment. The functional operation inhibit circuit 600 includes a respective AND gate 602, 604, 606 each receiving an inverted TR ENABLE and a respective second input of DC ENABLE, CLOCK ENABLE, and I/O ENABLE. An output of the AND gate 602 provides an input to disable a DC generator 608 of the chip being protected responsive to the tamper resistant control signal TR ENABLE. An output of the AND gate 604 provides an input to disable a clock generator 610 of the chip being protected responsive to the tamper resistant control signal TR ENABLE. An output of the AND gate 606 provides an input to disable an I/O circuit 612 of the chip being protected responsive to the tamper resistant control signal TR ENABLE.

The functional operation inhibit circuit 600 advantageously uses the generated TR enable signal to disable crucial parts of the chip to be protected preventing normal operation. It should be understood that many other crucial parts (not shown) of the chip can be disabled when TR ENABLE=1, in accordance with the present invention.

Figure 7:
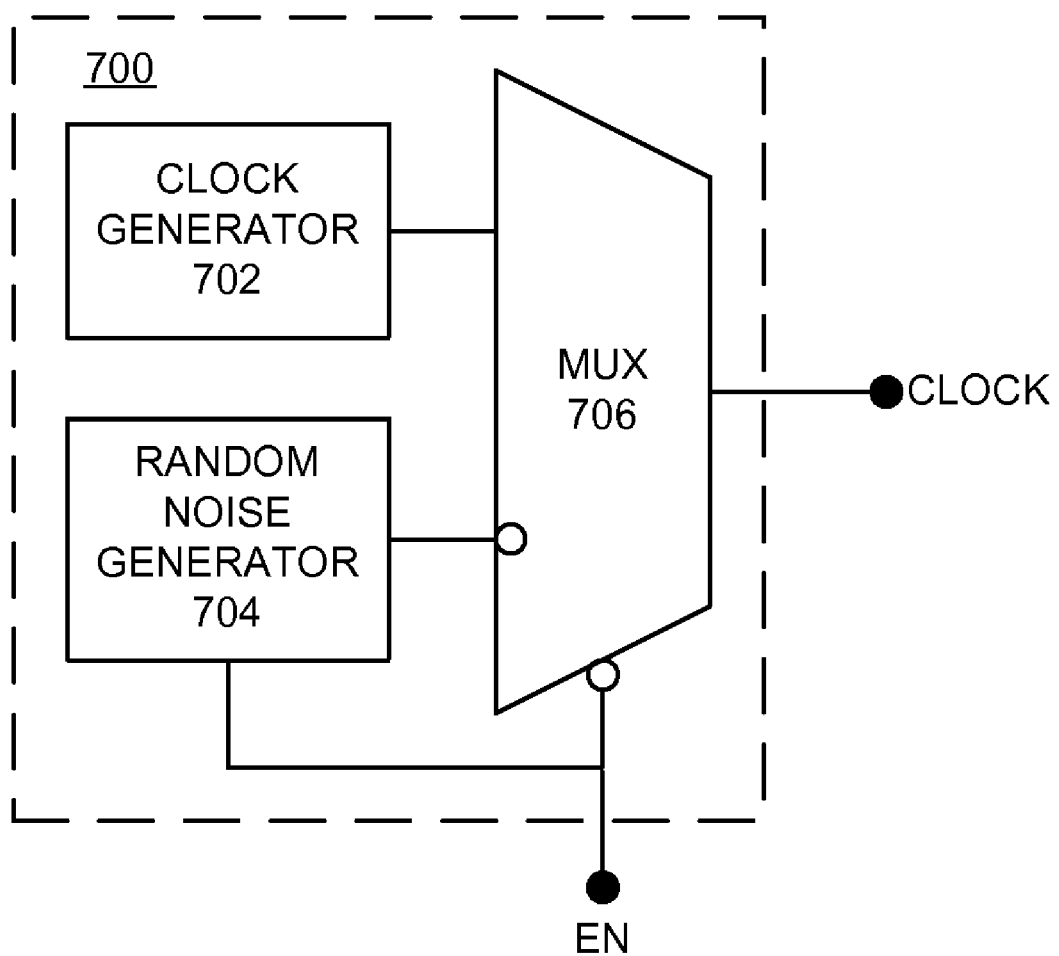
FIG. 7 is a schematic diagram representation illustrating another example functional operation inhibit circuit for inhibiting functional operation of the circuitry to be protected responsive to the tamper resistant control signal generated by the tamper resistant control signal generator of FIG. 5 in accordance with the preferred embodiment.

Referring now to FIG. 7, there is shown another example functional operation inhibit circuit generally designated by the reference character 700 for inhibiting functional operation of the circuitry to be protected responsive to the tamper resistant control signal generated by the tamper resistant control signal generated by the on-chip (or off-chip) sensing system 300 of FIG. 3 or tamper resistant control signal generator of FIG. 5 in accordance with the preferred embodiment.

The functional operation inhibit circuit 700 includes a clock generator 702 and a random noise generator 704 providing inputs to a multiplexer 706, with a select input receiving the enable control signal EN. The multiplexer 706 allows the choice of an internal chip clock to select a clock signal from an on-chip clock generator 702 or a random bit pattern from a random noise generator 704 depending on the enable control signal EN. That is, when the chip enters TR state, enable control signal EN=1, the chip system clock is replaced by a pseudo random bit pattern.

Based on principles of the present invention, it should be understood that the multiplexer 706 can be used to swap or replace any of various signals generated on the chip or provided from external sources with the pseudo random bit pattern to defeat reverse engineering of the chip responsive to a detected tampering state. The random noise generator 704 can be implemented, for example, with a design and operation of a pseudo random bit generator that is described in the U.S. Pat. No. 6,910,165 to Chen et al., entitled digital random noise generator, and assigned to the present assignee.

Figure 8:
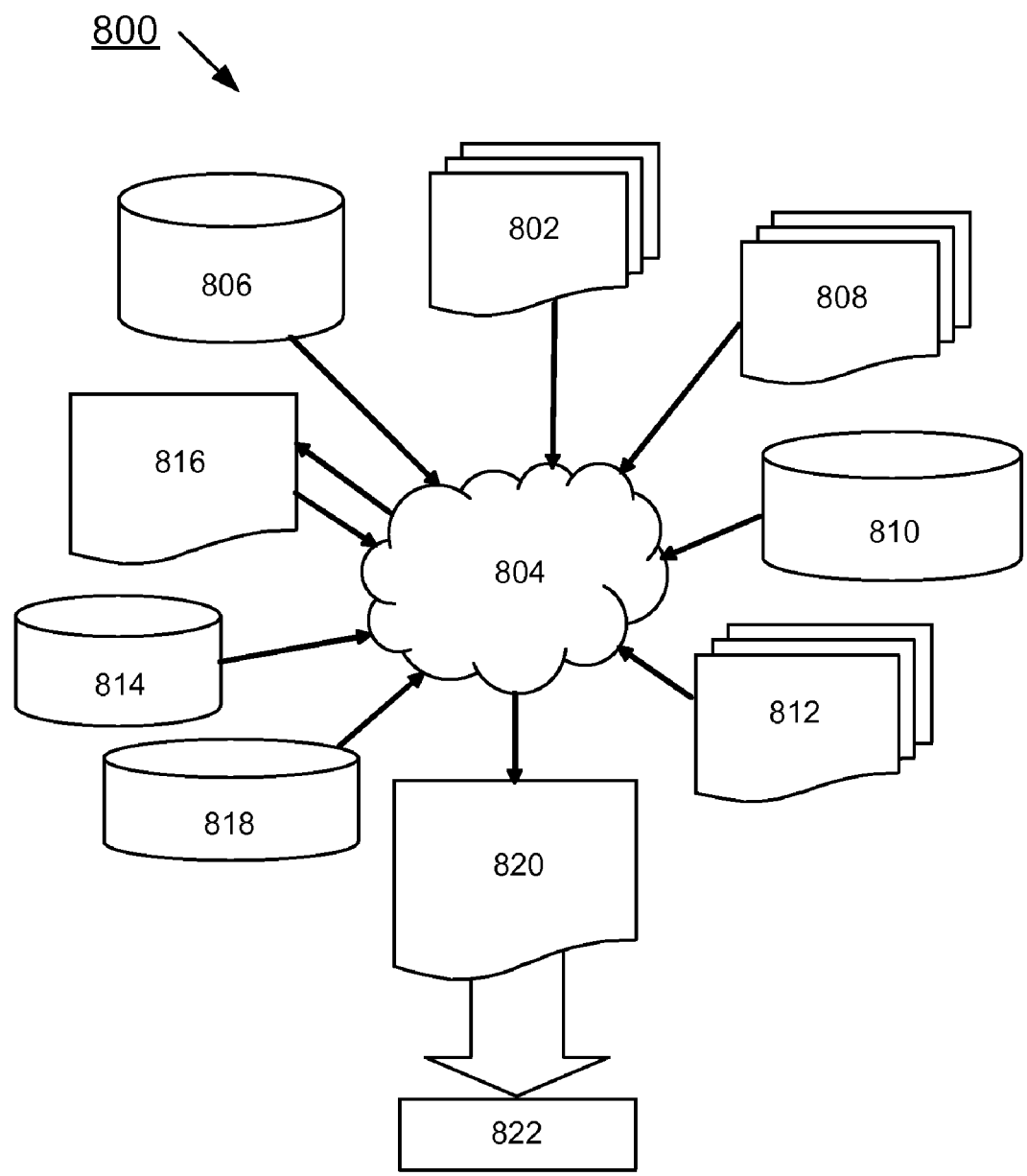
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 300, 400, 500, 600, 700 in the form of schematics or HDL, a hardware-description language, for example, Verilog, VHDL, C, and the like. Design structure 802 may be contained on one or more machine readable medium. For example, design structure 802 may be a text file or a graphical representation of circuits 300, 400, 500, 600, 700. Design process 804 preferably synthesizes, or translates, circuits 300, 400, 500, 600, 700 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuits.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 3, 4A, 4B, 5, 6, and 7 along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 3, 4A, 4B, 5, 6, and 7. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A tamper resistant circuit for resisting tampering in a semiconductor chip comprising:

a sensing device detecting a chip tampering state, said sensing device being formed with the semiconductor chip including the circuitry to be protected;

a tamper resistant control signal generator coupled to said sensing device, said tamper resistant control signal generator generating a tamper resistant control signal responsive to a detected chip tampering state; and a functional operation inhibit circuit coupled to said tamper resistant control signal generator, said functional operation inhibit circuit inhibiting functional operation of the circuitry to be protected responsive to the tamper resistant control signal; wherein said functional operation inhibit circuit includes a multiplexer for selecting a clock output from a random noise generator instead of a clock generator for inhibiting functional operation of the circuitry to be protected responsive to the tamper resistant control signal.

2. The tamper resistant circuit as recited in claim 1, wherein said sensing device includes a photodetector.

3. The tamper resistant circuit as recited in claim 1, wherein said sensing device includes a photodiode.

4. The tamper resistant circuit as recited in claim 1, wherein said tamper resistant control signal generator provides a zero state for the tamper resistant control signal during normal operation, wafer level testing, and module testing.

5. The tamper resistant circuit as recited in claim 1, wherein said tamper resistant control signal generator provides the tamper resistant control signal of a one state responsive to a detected chip tampering state.

6. The tamper resistant circuit as recited in claim 1, wherein said functional operation inhibit circuit deactivates an on-chip I/O block for inhibiting functional operation of the circuitry to be protected responsive to the tamper resistant control signal.

7. The tamper resistant circuit as recited in claim 1, wherein said functional operation inhibit circuit deactivates an on-chip clock generator block for inhibiting functional operation of the circuitry to be protected responsive to the tamper resistant control signal.

8. The tamper resistant circuit as recited in claim 1, wherein said functional operation inhibit circuit deactivates an on-chip DC generator block for inhibiting functional operation of the circuitry to be protected responsive to the tamper resistant control signal.

9. A tamper resistant method for resisting tampering in a semiconductor chip comprising:

forming a sensing device with the semiconductor chip including the circuitry to be protected; said sensing device being arranged for detecting a chip tampering state;

providing a tamper resistant control signal generator coupled to said sensing device, generating a tamper resistant control signal with said tamper resistant control signal generator responsive to a detected chip tampering state; and providing a functional operation inhibit circuit coupled to said tamper resistant control signal generator, applying said tamper resistant control signal to said functional operation inhibit circuit and inhibiting functional operation of the circuitry to be protected responsive to said tamper resistant control signal; wherein said functional operation inhibit circuit includes a multiplexer for selecting a clock output from a random noise generator instead of a clock generator for inhibiting functional operation of the circuitry to be protected responsive to the tamper resistant control signal.

10. The tamper resistant method as recited in claim 9, wherein providing a tamper resistant control signal generator coupled to said sensing device, generating a tamper resistant control signal with said tamper resistant control signal generator responsive to a detected chip tampering state includes providing a zero value for the tamper resistant control signal during normal operation, wafer level testing, and module testing.

11. The tamper resistant method as recited in claim 9, wherein forming said sensing device with the semiconductor chip including the circuitry to be protected includes forming a photodetector with the semiconductor chip.

12. The tamper resistant method as recited in claim 9, wherein forming said sensing device with the semiconductor chip including the circuitry to be protected includes forming a photodiode with the semiconductor chip.

13. The tamper resistant method as recited in claim 9, wherein applying said tamper resistant control signal to said functional operation inhibit circuit and inhibiting functional operation of the circuitry to be protected responsive to said tamper resistant control signal includes deactivates an on-chip I/O block for inhibiting functional operation of the circuitry to be protected responsive to the tamper resistant control signal.

14. The tamper resistant method as recited in claim 9, wherein applying said tamper resistant control signal to said functional operation inhibit circuit and inhibiting functional operation of the circuitry to be protected responsive to said tamper resistant control signal includes deactivates an on-chip DC generator for inhibiting functional operation of the circuitry to be protected responsive to the tamper resistant control signal.

15. The tamper resistant method as recited in claim 9, wherein applying said tamper resistant control signal to said functional operation inhibit circuit and inhibiting functional operation of the circuitry to be protected responsive to said tamper resistant control signal includes deactivating an on-chip clock generator block for inhibiting functional operation of the circuitry to be protected responsive to the tamper resistant control signal.

16. A design structure embodied in a machine readable medium used in a design process, the design structure comprising:

a tamper resistant circuit tangibly embodied in the machine readable medium used in the design process, said tamper resistant circuit for resisting tampering in a semiconductor chip, said tamper resistant circuit including:

a sensing device detecting a chip tampering state, said sensing device being formed with the semiconductor chip including the circuitry to be protected;

a tamper resistant control signal generator coupled to said sensing device, said tamper resistant control signal generator generating a tamper resistant control signal responsive to a detected chip tampering state; and a functional operation inhibit circuit coupled to said tamper resistant control signal generator, said functional operation inhibit circuit inhibiting functional operation of the circuitry to be protected responsive to the tamper resistant control signal, wherein said functional operation inhibit circuit includes a multiplexer for selecting a clock output from a random noise generator instead of a clock generator for inhibiting functional operation of the circuitry to be protected responsive to the tamper resistant control signal and the design structure, when read and used in the manufacture of a semiconductor chip produces a chip comprising said tamper resistant circuit.

17. The design structure of claim 16, wherein said functional operation inhibit circuit deactivates an on-chip data I/O circuit for inhibiting functional operation of the circuitry to be protected responsive to the tamper resistant control signal.

18. The design structure of claim 16, wherein the design structure comprises a netlist, which describes said tamper resistant circuit.

19. The design structure of claim 16, wherein the design structure resides on storage medium as a data format used for the exchange of layout data of integrated circuits.

20. The design structure of claim 16, wherein the design structure includes at least one of test data files, characterization data, verification data, or design specifications.

21. The design structure of claim 16, wherein said sensing device includes a photodetector.

22. The design structure of claim 16, wherein said functional operation inhibit circuit deactivates an on-chip DC generator for inhibiting functional operation of the circuitry to be protected responsive to the tamper resistant control signal.

23. The design structure of claim 16, wherein said functional operation inhibit circuit deactivates an on-chip clock generator for inhibiting functional operation of the circuitry to be protected responsive to the tamper resistant control signal.

* * * * *